United States Patent
Halvorson, Jr. et al.

[11] Patent Number: 5,848,798
[45] Date of Patent: Dec. 15, 1998

[54] OFFICE CART

[75] Inventors: Harold Halvorson, Jr., Grand Rapids; Greg D. Lamke, Hastings; Joyce S. Bromberg, Grand Rapids, all of Mich.

[73] Assignee: Steelcase Inc., Grand Rapids, Mich.

[21] Appl. No.: 661,394

[22] Filed: Jun. 7, 1996

[51] Int. Cl.⁶ ...................................................... B62B 11/00
[52] U.S. Cl. .................. 280/47.35; 211/134; 248/441.1; 280/47.19; 280/79.3; 434/429; 434/432
[58] Field of Search ............................. 280/47.19, 47.35, 280/79.3; 211/134, 135, 151, 153; D34/19, 20, 21, 22; 248/441.1; 312/208.1, 351.11, 351.12, 351.13; 434/429, 430, 432; 108/143

[56] References Cited

U.S. PATENT DOCUMENTS

| | | | |
|---|---|---|---|
| D. 152,249 | 1/1949 | Fox | 280/47.35 |
| D. 187,654 | 4/1960 | Harper | 280/47.35 |
| D. 330,104 | 10/1992 | Ackley | D34/21 |
| 1,077,515 | 11/1913 | Fanning | 434/432 |
| 1,700,212 | 1/1929 | Arlt | 211/134 |
| 1,951,202 | 3/1934 | Ohnstrand | 211/134 |
| 2,468,513 | 4/1949 | Rider | 211/134 |
| 3,149,726 | 9/1964 | Magers | 211/134 |
| 3,445,150 | 5/1969 | Zartarian | 280/47.35 |
| 3,468,039 | 9/1969 | Dubbert | 434/429 |
| 3,908,562 | 9/1975 | Wittschen | D34/21 |
| 4,391,454 | 7/1983 | Marsh et al. | 280/47.35 |
| 4,848,710 | 7/1989 | Newman | 248/441.1 |
| 5,287,815 | 2/1994 | Gross | 312/208.1 |
| 5,584,546 | 12/1996 | Gurin et al. | 312/351.11 |

*Primary Examiner*—Thomas J. Brahan
*Attorney, Agent, or Firm*—Price, Heneveld, Cooper, DeWitt & Litton

[57] ABSTRACT

An office cart includes a pair of laterally spaced apart side walls, a plurality of vertically spaced apart elongate fixed shelves, a back wall which extends between the side walls and which is disposed adjacent to the vertically spaced apart shelves, and a plurality of wheels mounted to the cart to facilitate transportability of the cart. The cart provides convenient storage of files, office supplies and like articles associated with a particular project or task or group of related projects or tasks which are assigned to an individual or to a small team comprised of two or more individuals. The cart also provides a mobile, upright, open storage facility having a relatively high storage capacity in relationship to the amount of floor space which it occupies, thereby providing an office cart which is particularly well suited for efficiently facilitating and supporting individual and group tasks or projects in a dynamic office environment where mobility and accessibility of shared project resources are important.

4 Claims, 5 Drawing Sheets

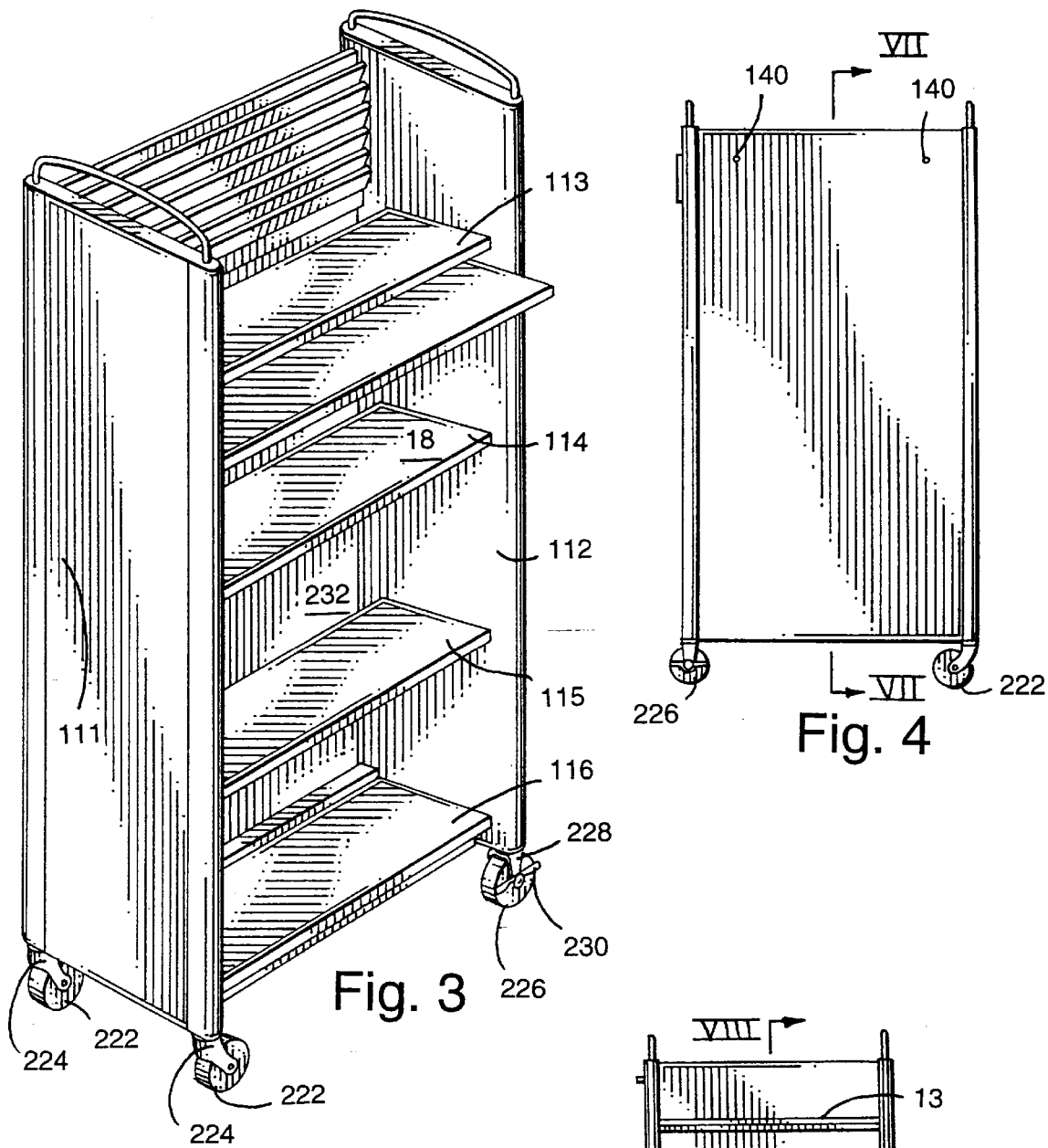
Fig. 3
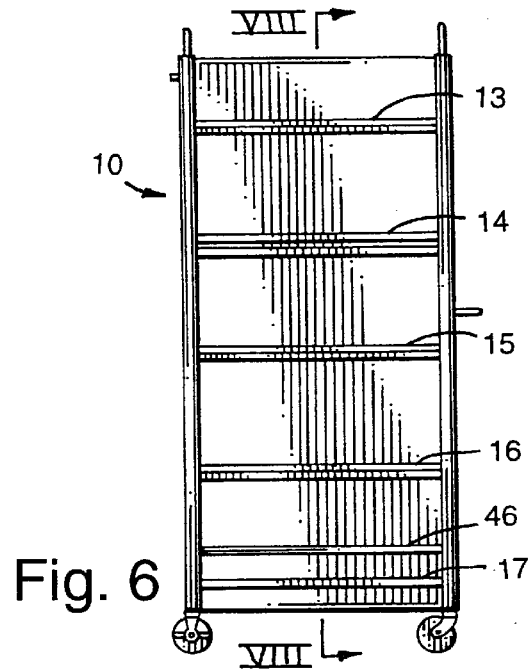
Fig. 4
Fig. 6

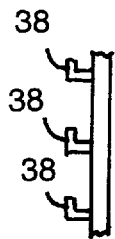
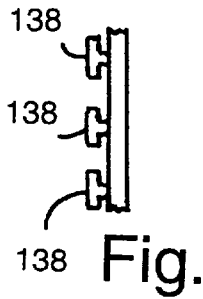
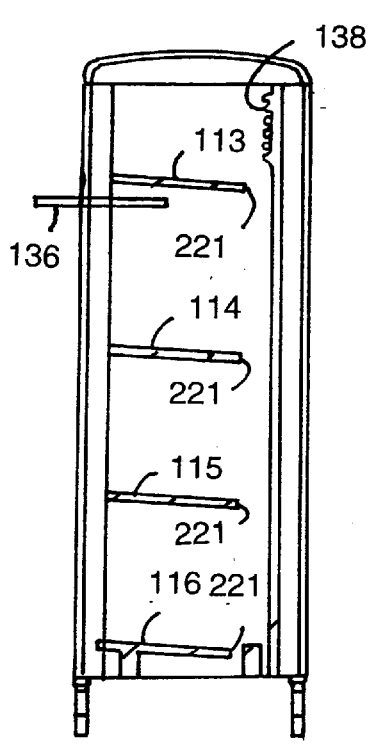
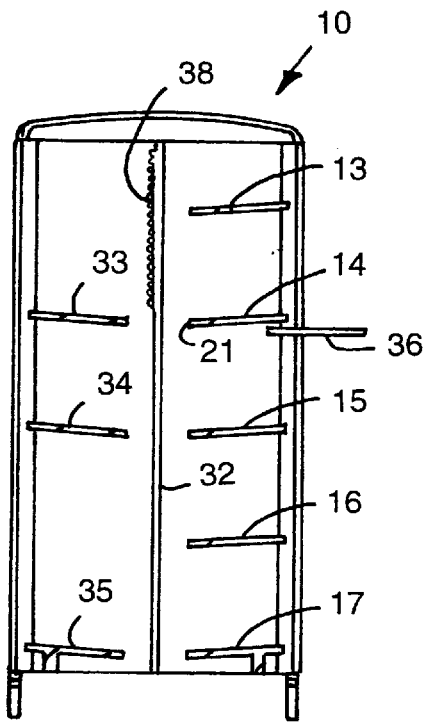

OFFICE CART

CROSS-REFERENCES TO RELATED APPLICATIONS

This application is related to subject matter disclosed in commonly assigned, copending U.S. Design patent application Ser. No. 29/055,598, filed Jun. 7, 1996, entitled MOBILE CART, and Design patent application Ser. No. 29/055,580, filed Jun. 7, 1996, entitled MOBILE CART, which are hereby incorporated herein by reference.

FIELD OF THE INVENTION

This invention relates to mobile office furniture and more particularly to office carts for efficiently facilitating and supporting individual and group tasks or projects in a dynamic office environment where the mobility and accessibility of shared project resources are important considerations in expediting the successful completion of such projects.

BACKGROUND OF THE INVENTION

Open office plans employing systems furniture, wherein open floor spaces are partitioned into individual work stations by movable panels which are configured to support hang-on furniture units, such as worksurfaces, overhead cabinets, shelves, etc., have become increasingly popular (as compared with more traditional office plans employing traditional office furnishings) because of the ability to more rapidly reconfigure available office space to suit rapidly changing needs in the work environment. The ability to easily reconfigure office space has become increasingly important as businesses have moved away from traditional organizational strategies, employing more permanent, narrowly defined departmental or functional divisions, toward specialized project or mission oriented groups or teams comprising individuals having differing expertise and who are collectively and cooperatively devoted to relatively specific short-term goals. The ability to rapidly reconfigure the office space allows members of such teams to be quickly and easily physically situated in convenient proximity to each other to facilitate frequent interaction between team members and to enable the free-flow of information and ideas, such as through impromptu brainstorming sessions. However, many businesses which have regularly and successfully employed the team concept, desire furnishings which further facilitate and support team efforts. In particular, there is a perceived need for multi-functional furnishings which are even more portable, mobile, compact, and adaptable to the particular requirements and needs of a team of workers devoted to the successful and timely completion of a specific project. More specifically, there is a perceived need for an article of furniture which can serve as a portable or mobile communications and project resources hub for storing files, drawings, models or other articles containing information which is shared by the members of a project team, and/or for storing miscellaneous office supplies or the like which are needed by the team members. Further, it is desirable that such article of furniture be relatively compact, so that it can be easily transported through corridors and doorways, and so that it does not occupy much space in an office. Additionally, it is desirable that the article of furniture be readily reassignable and adapted for use by a new project team after a team to which the article of furniture is assigned has completed their project.

SUMMARY OF THE INVENTION

It is an object of this invention to provide an office cart for convenient storage of files, office supplies and like articles associated with a particular project or task or group of related projects or tasks which are assigned to an individual or to a small team comprised of two or more individuals. It is a further object of the invention to provide a cart which is intended to serve as a mobile hub for activities related to a project or group of related projects, which can be quickly and easily transported as needed from a first work area, such as an open office space assigned to the team, to a second work area such as a conference room. In addition to providing storage space for files, drawings and other materials associated with a project or group of related projects, a still further object of the invention is to provide an office cart which is designed to facilitate communication by serving as a location where team members can pick-up and leave their mail, leave notes, store files, and conduct brainstorming activities.

The above objectives and further advantages are achieved by the provision of an office cart which includes a pair of laterally spaced apart side walls, and a plurality of vertically spaced apart elongate shelves, each shelf being supportingly connected at opposite ends thereof to the side walls. The cart also includes a back wall which extends from between the side walls and which is disposed adjacent to elongate edges on one side of the shelves. A plurality of wheels are mounted to the cart to facilitate transportation thereof.

The invention has the advantage of providing a mobile, upright, open storage facility having a relatively high storage capacity in relationship to the amount of floor space which it occupies. The general purpose shelving allows user versatility with respect to the storage of various articles such as binders, box filings, roll drawings, etc.

BRIEF DESCRIPTION OF THE DRAWINGS

FIG. 3 is a front, left-side perspective view of the office cart shown in FIG. 2;

FIG. 4 is a rear elevational view of the office cart shown in FIGS. 2 and 3;

FIG. 6 is a rear elevational view of the office cart shown in FIGS. 1 and 5;

FIG. 7 is a cross-sectional view of the office cart, as viewed along lines VII—VII of FIG. 4;

FIG. 8 is a cross-sectional view of the office cart, as viewed along lines VIII—VIII, of FIG. 6;

FIG. 9 is an enlarged fragmentary cross-sectional view showing details of the slat wall shown in FIG. 7; and FIG. 10 is an enlarged fragmentary cross-sectional view showing details of the slat wall shown in FIG. 8.

DESCRIPTION OF THE PREFERRED EMBODIMENTS

Figure 1:
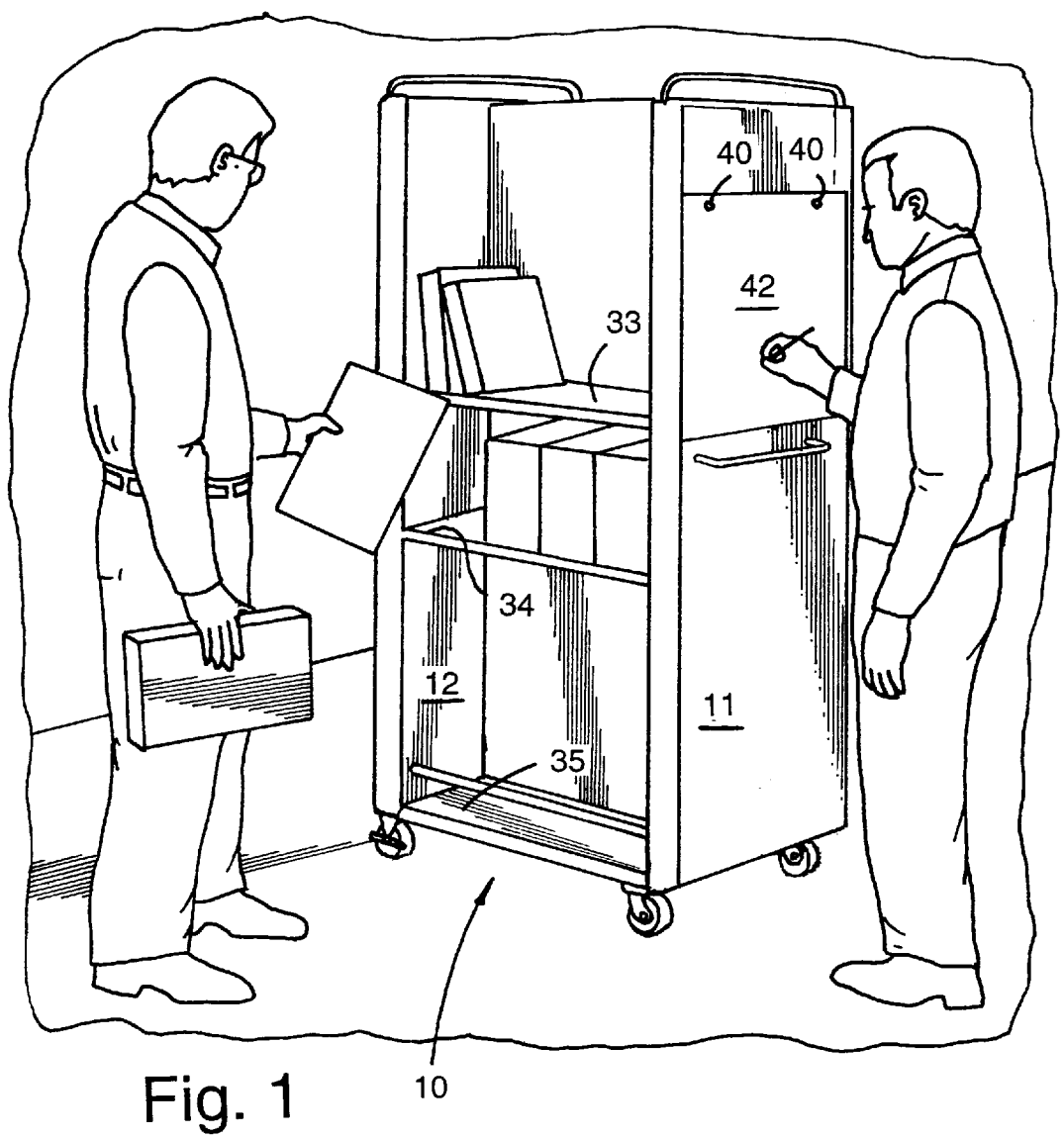
FIG. 1 is a perspective view of an office cart in accordance with a first embodiment of the invention, which is being utilized in a typical office setting.

There is shown, in FIG. 1, a team office cart 10 in accordance with a first embodiment of the invention. Team office cart 10 generally comprises laterally spaced apart side walls 11, 12 and a plurality of vertically spaced apart elongate shelves 13, 14, 15, 16, and 17 (FIGS. 6 and 8). Shelves 13–17 are generally board-like structures, having an upper support surface 18 and an opposing bottom surface 19, a front side 20 and an opposing rear side 21, and a left end or side (not shown) connected with and supported by left side wall 11 and an opposing right end or side (not shown) attached to and supported by right side wall 12. Cart 10 includes four wheels, each of the four wheels being generally located near a corresponding one of the four corners of the cart. The illustrated embodiment includes swivel wheels 22 having axle supports 24 which are mounted to opposite sides of left side wall 12 for rotation about a substantially vertical axis, and two wheels 26 having axle supports 28 which are fixedly mounted to opposite sides of right side wall 13. Swivel wheels 22 facilitate steering of the cart when it is moved from one location to another. Each of wheels 26 preferably includes a brake mechanism 30 to maintain cart 10 in a stationary condition at a desired location.

Cart 10 also includes a substantially vertical back wall 32 which extends between the side walls 11, 12 and which is disposed adjacent to elongate rear sides 21 of shelves 13–17, but which is spaced from the rear sides 21 to allow light to pass downwardly and/or upwardly through the gaps between wall 32 and the rear sides 21 of shelves 13–17. The gaps between back wall 32 and the rear sides 21 of shelves 13–17, in addition to allowing light to pass between shelves to provide better illumination, especially of lower shelves, provides the cart 10 with a more aesthetically pleasing open appearance. The front and rear sides of the cart 10 are preferably left open, i.e. they are free of any doors or other closures, to provide easy access to articles stored on the cart. The resulting cart has a substantially H-shaped horizontal cross section which facilitates access to materials on the cart without any need to open doors or other closures to place items on the cart or remove items from the cart.

The rear side of team office cart 10 also includes a plurality of shelves 33, 34, 35, each of which is supportingly connected at opposite ends thereof to the side walls 12, 13 to provide a plurality of shelves disposed on each side of wall 32. As with shelves 13–17, shelves 33–35 are disposed adjacent to, but spaced from, wall 32.

As noted in FIG. 8, shelves 13–17 and 33–35 slope slightly downwardly toward wall 32 so that files, books, and other articles stored on the shelves are stably and securely supported by the shelves and rest against wall 32. This is particularly desirable to prevent items stored on the shelves from falling off during transportation of the office cart. The angle of shelves 13–17 and 33–35 is generally about the smallest angle which will effectively prevent items from falling from the cart during transportation thereof. A suitable angle is about 5 degrees or less with respect to a horizontal plane.

As shown in FIG. 8, the highest shelves 14 and 33, on each side of the cart, are disposed at an elevation below the top edge of side walls 11, 12, so that files, books and other articles stored on the top shelves will be stably supported between the shelf, back wall and side walls of the cart during transportation thereof. In particular, by positioning the top shelf a suitable distance below the upper edge of the side walls 11, 12, files, books and other articles stored on the top shelf are prevented from sliding off the shelf or toppling over the side walls. A suitable spacing of the top shelf from the top edge of the side walls is at least about half of the width of the shelf.

As shown in FIG. 8, team office cart 10 includes a sliding shelf 36 which can be pulled out from beneath fixed shelf 14 to provide a convenient work surface which can, for example, be used as a writing surface. The opposing ends of pull-out shelf 36 can be slidably and supportedly connected to left and right side walls 11, 12 using conventional tracks or the like such as are typically employed for sliding drawers.

The upper portion of at least one side of wall 32 includes a plurality of elongate, hook-like slats 38 which are vertically spaced apart from each other and which extend between the side walls 11, 12. Slats 38 can have a L-shaped transverse cross section as shown in FIG. 9 or a T-shaped cross section as shown in FIG. 10. The plurality of uniformly, vertically spaced apart slats 38 connected to a substantially vertical wall 32 provide what is generally well known as a "slat wall" surface which can be used for attaching any of various amenities to the cart 10 to customize or personalize the cart to suit the particular needs or requirements of the team or individual utilizing the cart. Examples of amenities which can be attached or hooked to the slat wall include fans, task lights, binder bins, paper tray managers, utility trays, pencil boxes, paperclip boxes, and the like.

As shown in FIG. 1, team office cart 10 includes studs 40 mounted on the outer surface (the surface away from the shelves) of left side wall 12. The studs 40 are spaced apart and aligned horizontally and serve as holders for a flip chart 42. Flip chart 42 helps facilitate impromptu brainstorming sessions between team members by allowing them to write down their ideas or otherwise visually depict their ideas on a relatively large vertical display surface so that all of the members can simultaneously view the information depicted on the flip chart.

A pull handle 44 is attached to the left side wall 12 to facilitate movement of the cart from one location to another location. Disposed above lower shelf 35 on one side of cart 10 is a retainer bar 46 generally overlying the outer side 48 of shelf 35. Retainer bar 46 helps hold articles on shelf 35 during transportation of cart 10. A team identifier holder 50 is provided on the outer surface of left side wall 12 for holding a card or tag which identifies the individual or team to which the cart is assigned.

The cart 10 with its plurality of vertically spaced apart shelves 14–17 and 33–55 disposed on either of a wall 32 provides a means for efficiently organizing a large amount of materials needed for a particular project, in a compact, mobile article of furniture. In particular, the cart includes more than three vertically spaced apart shelves on at least one side thereof, thereby providing high storage capacity which is readily accessible and which is achieved in a relatively compact structure.

Figure 2:
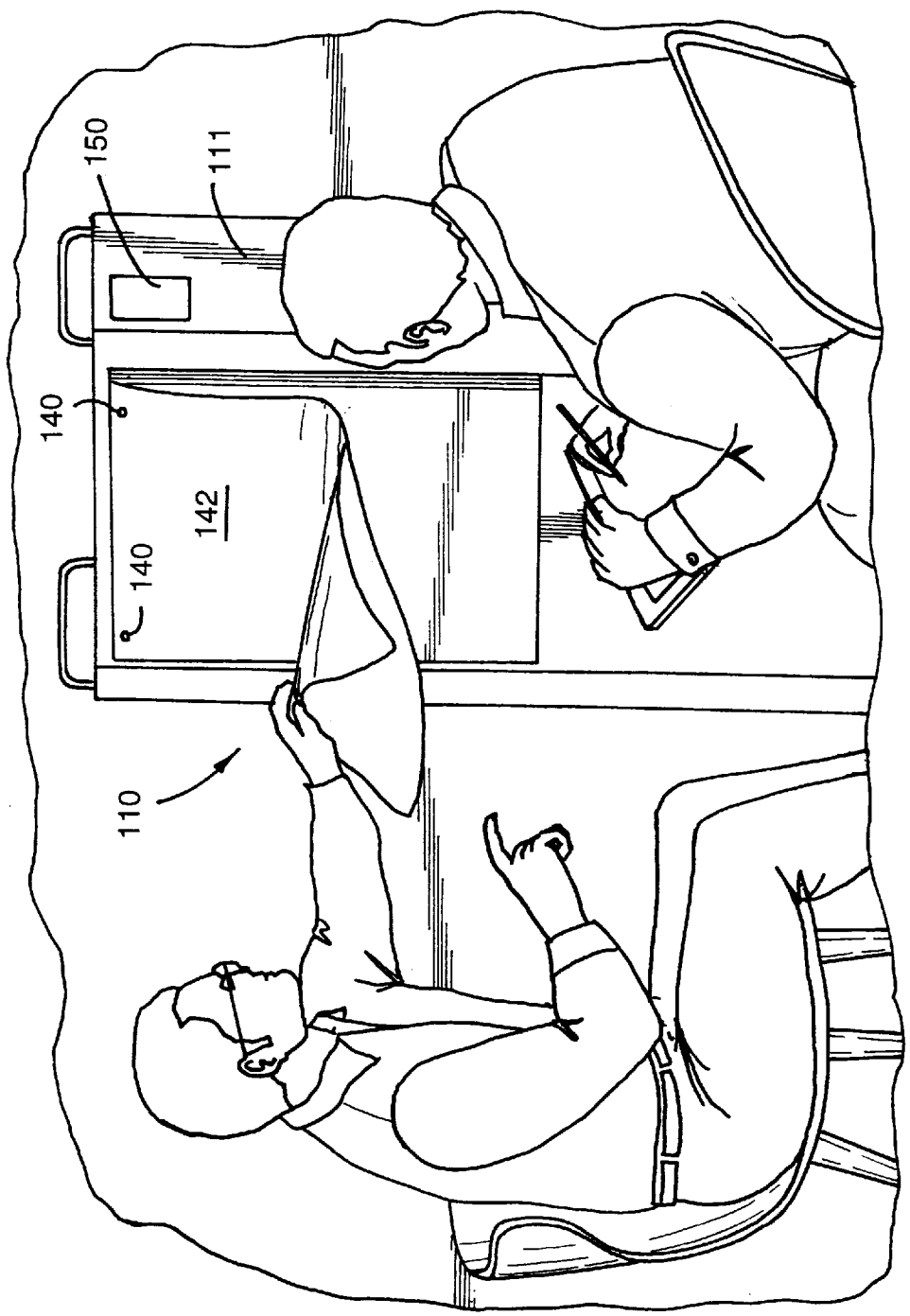
FIG. 2 is a perspective view of an office cart in accordance with an alternative embodiment of the invention, being utilized in a typical office setting.
Figure 5:
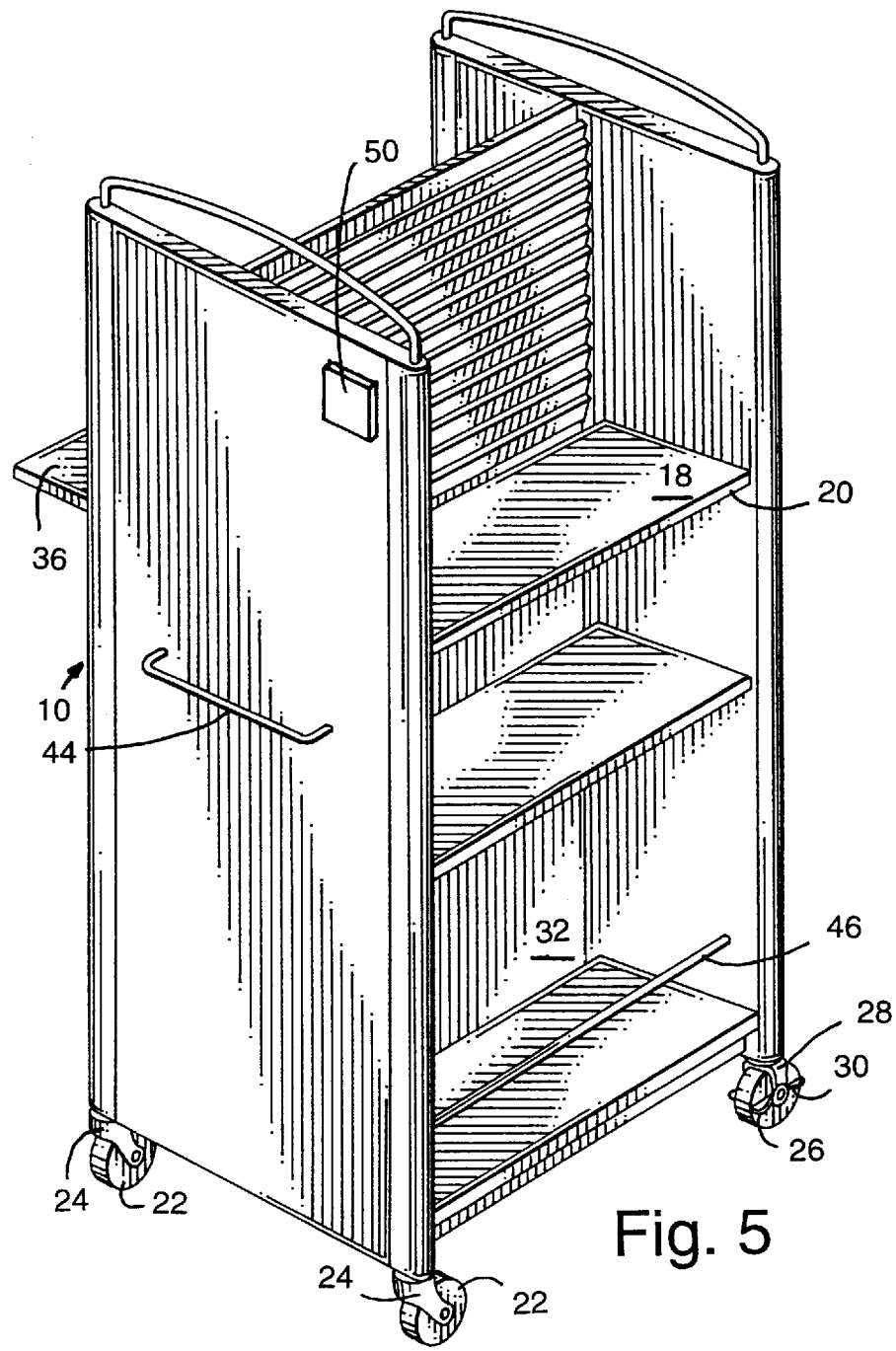
FIG. 5 is a front, left-side elevational view of the office cart shown in FIG. 1.

With reference to FIG. 2, there is shown an alternative embodiment of a smaller team or individual office cart 110 having left and right side walls 111, 112 which are laterally spaced apart, and a plurality of vertically spaced apart elongate shelves 113, 114, 115 and 116. Each of the shelves 113–116 is supportingly connected at opposite ends thereof to the side walls 111, 112. Cart 110 has four wheels, each of which is generally located near a corresponding one of the four corners of the cart. As with team cart 10, cart 110 includes a pair of swivel wheels 222, each having an axle support 224 which is mounted to left side wall 111 for rotational movement about a vertical axis, and a pair of wheels 226 having axle supports 228 which are fixedly mounted to right side wall 113. Swivel wheels 222 allow cart 110 to be steered when it is transported from one location to another location. Wheels 226 preferably include brake mechanisms 230 which prevent movement of cart 110 when desired. Cart 110 includes a substantially vertical back wall 232 which extends between the side walls 111, 112 and which is disposed adjacent to elongate rear sides 221 of the shelves 113–116.

As shown in FIG. 7, shelves 114–117 are spaced away from partition wall 232 to allow light to pass downwardly and/or upwardly through the gap between the rear side 221 of shelves 111–116 and wall 232, and to provide an aesthetically pleasing open appearance. A sliding, pull-out shelf 136 is generally disposed beneath upper shelf 113 to provide a convenient work surface if desired. The pull-out shelf 136 (generally similar to pull-out shelf 36 of cart 10) can be moved between a retracted position when shelf 136 is generally positioned beneath fixed shelf 113 and an extended position wherein shelf 136 is generally in side by side juxtaposition with shelf 113.

The upper portion of wall 132 is provided with a plurality of uniformly spaced apart horizontally elongate slats 138 having a hook-like cross sectional shape, such as the L-shaped slats shown in FIG. 9 or the T-shaped slats shown in FIG. 10. The rear side of wall 132 is provided with a pair of spaced apart, horizontally aligned studs 40 for supporting a flip chart 142 as shown in FIG. 2. A project identifier holder 150 is attached to the outer side of left side wall 111 as shown in FIG. 2. Holder 150 is preferably a clear box-like member which is open at the top or one of the sides to allow a card or tag to be inserted and the indicia thereon to be visually observable through the holder.

It will be apparent to those skilled in the art that various modifications to the preferred embodiment of the invention as described herein can be made without departing from the spirit or scope of the invention as defined by the appended claims.

The embodiments of the invention in which an exclusive property or privilege is claimed are defined as follow:

1. An office cart comprising a pair of laterally spaced apart side walls, a back wall which extends between the side walls, the side walls and the back wall forming a frame having an H-shaped horizontal cross section, a plurality of vertically spaced apart shelves being disposed on each side of the back wall, the shelves being spaced away from the back wall to allow light to pass through a resulting gap between the shelves and the back wall, the shelves sloping downwardly toward the back wall to provide stable support for items on the shelves when the cart is being transported, a sliding pull-out shelf which can be moved between a retracted position generally beneath an adjacent fixed shelf and an extended position wherein the pull-out shelf is generally in side-by-side juxtaposition with the adjacent fixed shelf, and a plurality of wheels mounted to the cart to facilitate transportability of the cart, wherein a front of the cart is free of closure members to facilitate unfettered access to the shelves, and wherein a top shelf is disposed below an upper edge of the side walls so that items placed on the top shelf are stably retained by the back wall and the side walls during transportation of the cart and wherein an outer surface of one of the side walls opposite the side facing the shelves includes a pair of spaced apart studs in horizontal alignment for supporting a flip chart.

2. The office cart of claim 1, wherein the top shelf is spaced below the upper edge of the side walls by a distance of at least about half the width of the top shelf.

3. The office cart of claim 1, wherein the shelves are angled downwardly toward the back wall by an angle of less than about 5 degrees with respect to a horizontal plane.

4. The office cart of claim 1, further comprising an identifier holder attached to an outer surface of one of the side walls opposite the side facing the shelves, the holder being configured for holding a card or tag and displaying indicia written or printed on the card or tag.

* * * * *